US010728366B2

(12) United States Patent
Aoki (10) Patent No.: US 10,728,366 B2
(45) Date of Patent: Jul. 28, 2020

(54) COMMERCE ORIENTED UNIFORM RESOURCE LOCATER (URL) SHORTENER

(71) Applicant: PAYPAL, INC., San Jose, CA (US)

(72) Inventor: Norihiro Edwin Aoki, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/174,985

(22) Filed: Oct. 30, 2018

(65) Prior Publication Data

US 2019/0158631 A1 May 23, 2019

Related U.S. Application Data

(63) Continuation of application No. 15/273,271, filed on Sep. 22, 2016, now Pat. No. 10,116,769, which is a continuation-in-part of application No. 13/868,883, filed on Apr. 23, 2013, now Pat. No. 9,477,771.

(51) Int. Cl.
*G06F 3/00* (2006.01)
*H04L 29/06* (2006.01)
*G06F 16/955* (2019.01)
*H04L 29/08* (2006.01)

(52) U.S. Cl.
CPC .......... *H04L 67/42* (2013.01); *G06F 16/9566* (2019.01); *H04L 67/146* (2013.01)

(58) Field of Classification Search
CPC .... G06F 16/9566; H04L 67/42; H04L 67/146
See application file for complete search history.

(56) References Cited

U.S. PATENT DOCUMENTS

| 6,957,224 | B1 | 10/2005 | Megiddo et al. |
| 8,965,894 | B2* | 2/2015 | Mahadevan .......... G06F 16/954 707/737 |
| 2004/0083215 | A1 | 4/2004 | De Jong |
| 2009/0240638 | A1* | 9/2009 | Kirpal ................. G06F 16/9566 706/12 |
| 2012/0214443 | A1 | 8/2012 | Daigle |

* cited by examiner

*Primary Examiner* — Mahelet Shiberou
(74) *Attorney, Agent, or Firm* — Haynes and Boone, LLP (57) ABSTRACT

A uniform resource locator (URL) shortener relies on client-side support to embed links to websites into, for example, text messages, emails, tweets, or other forms of microblogging, and that provides additional capabilities. A method may include: recognizing a token indicator; recognizing a token in conjunction with the token indicator; selecting a template corresponding to the token indicator; and executing a process enabled according to the token and the template. Executing an enabled process may include one or more of: generating a URL; generating a URL that is itself a server-based URL shortener, in which the token indicator is substituted for the server-based URL shortener hostname to reduce the character count from that of the server-based URL shortener; displaying information from a destination website of the URL generated from the token and the template; or generating a URL according to a distinctive visual characteristic of the token indicator.

20 Claims, 3 Drawing Sheets

COMMERCE ORIENTED UNIFORM RESOURCE LOCATER (URL) SHORTENER

CROSS-REFERENCE TO RELATED APPLICATIONS

This application is a continuation of U.S. patent application Ser. No. 15/273,271 filed on Sep. 22, 2016 and entitled "COMMERCE ORIENTED UNIFORM RESOURCE LOCATER (URL) SHORTENER" (to issue as U.S. Pat. No. 10,116,769 on Oct. 30, 2018), which is a continuation of U.S. patent application Ser. No. 13/868,883 filed on Apr. 23, 2013 and entitled "COMMERCE ORIENTED UNIFORM RESOURCE LOCATER (URL) SHORTENER" (issued as U.S. Pat. No. 9,477,771 on Oct. 25, 2016), the contents both of which are hereby incorporated by reference in their entirety for all purposes.

BACKGROUND

Technical Field

Embodiments of the present invention generally relate to online commerce and server-client communication conducted over a network such as the Internet and, more particularly, to a client assisted mechanism for URL shortening that provides user-visible iconography.

Related Art

A uniform resource locater (URL) when used to reference a location, e.g., a webpage or data file, on the Internet often includes lengthy descriptive attributes, which may represent, for example, data hierarchies, command structures, transaction paths, and session information. Such a URL may be long, difficult to read, and virtually impossible to remember.

With the growing popularity of social networking websites that facilitate various forms of instant communication, such as "tweets" and "status updates", which may also generally be referred to as "microblogging", and the concomitant use of microblogging applications, for which efficient (e.g., brief) text communication is at a premium, URL shorteners (e.g., URL shortening services) have emerged as a way to permit the inclusion of (often very long) URL links into a micro blog message while keeping short the character count of the message in order to fit within the size limitations of microblogging websites. URL shortening services do that by providing a shortened URL for a longer one and redirecting a user to the longer URL corresponding to the shortened one. Conventional URL shortening services may still result, however, in the use of a dozen characters or more for the shortened URL, and are typically opaque to a user in the sense that the user can't tell from looking at the shortened link what clicking on the link will do, e.g., show the user a photo or take the user to a product page.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments for a URL shortening system or service (also referred to as "URL shortener") that may make use of client-side support (in contrast to a conventional URL shortener implemented on a server) to create a shortened link to a web page having a much longer URL, providing a new kind of URL shortener that relies on client-side support to embed links to websites into, for example, a text message (e.g., SMS text), email, tweet, status update, or other form of microblogging. URL shorteners according to one or more embodiments may be especially suited for commerce and payments, but embodiments can also be used for many special purposes as well as generic applications. In one or more embodiments, the shortened link may provide—through the use of special symbols, for example—additional information to the user about the content of the link or where it points. One or more embodiments may be used (e.g., by a user from the client device) to produce full links to web pages from either a shortened text link, a graphics image, or a graphics image that includes some text information. In some embodiments, the URL shortener may be implemented entirely on the client-side device or, for added flexibility of implementation and use, may incorporate a server-side component.

URL shortening services and provision of a client-side URL shortener may be included in services provided by a service provider (SP). The SP may, for example, provide libraries for a client device that can provide different versions or varying applications for embodiments of the client-side URL shortener. Service provider services may also include, for example, an online payment service operating between consumers and merchants and may also be a service provided by a financial service provider (FSP)—such as PayPal, Inc. of San Jose, Calif.—in which a user of the service may have an account with the FSP (referred to as an "FSP account). In commercial applications, a URL shortener service according to one or more embodiments could be used by a financial service provider's proprietary websites and mobile apps to generate and display shortened URLs, and the URL shortener service techniques could be made available to non-proprietary third party websites and applications to allow them to easily link back to the properties of the FSP or to others.

In one or more embodiments, methods, systems, and computer program products are provided for: a URL shortener that relies on client-side support to embed links to websites into, for example, a text message (e.g., SMS text), email, tweet, status update, or other form of microblogging, and that provides additional capabilities. For example, a computer-implemented method may include: recognizing a token indicator; recognizing a token in conjunction with the token indicator; selecting a template corresponding to the token indicator; and providing an output or enabling a process according to the token and the template. Providing an output, or executing a process enabled according to the token and the template, may include one or more of: generating a uniform resource locator (URL) in a computer-readable form; generating a uniform resource locator (URL) that is itself a server-based URL shortener, in which the token indicator is substituted for the server-based URL shortener hostname to reduce the character count from that of the server-based URL shortener; displaying information from a destination website of a uniform resource locator (URL) generated from the token and the template; and generating a uniform resource locator (URL) according to a distinctive visual characteristic of the token indicator.

Figure 1:
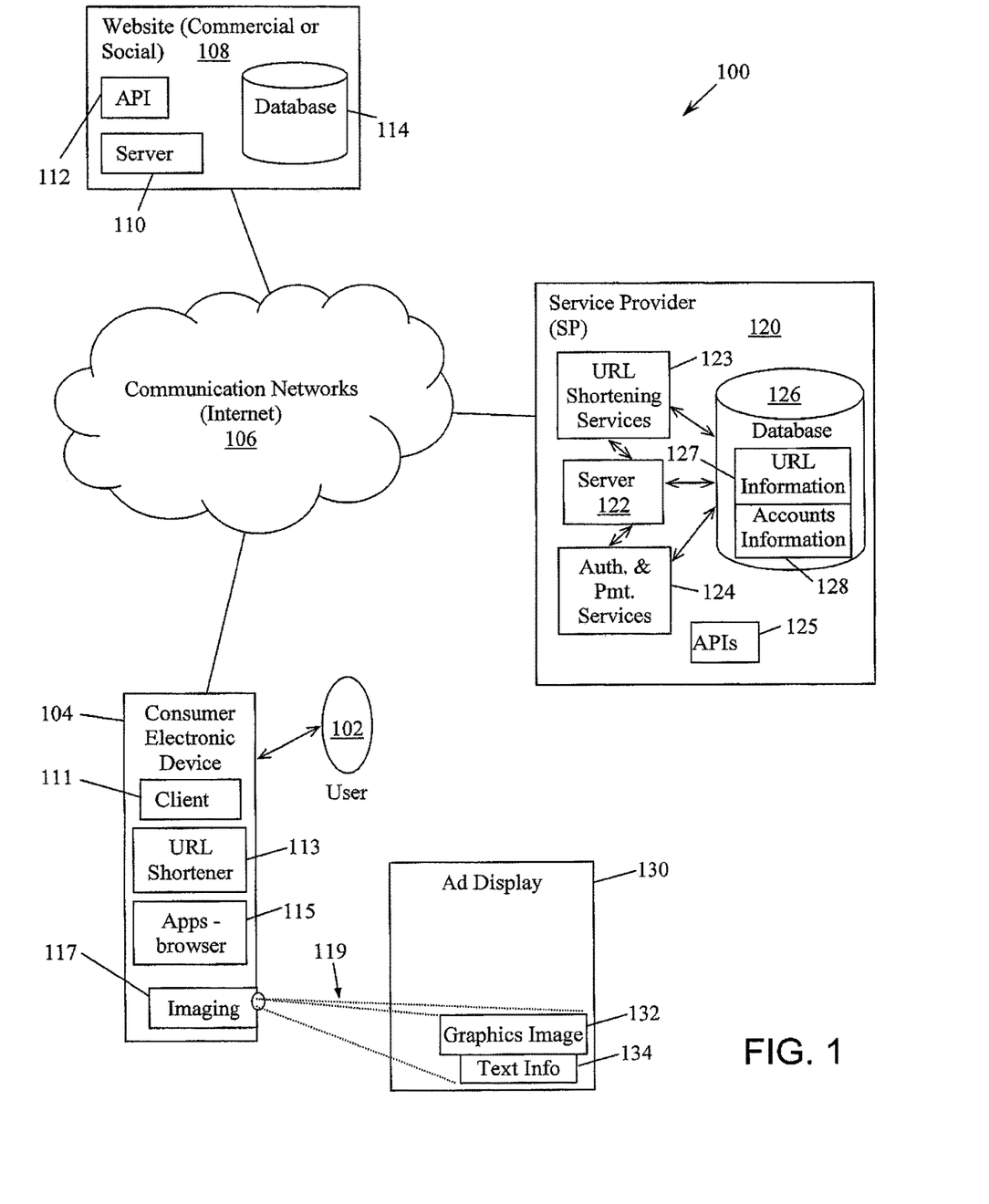
FIG. 1 is a system diagram illustrating a URL shortening system in accordance with one or more embodiments of the present invention.

FIG. 1 illustrates a system 100 for online commerce and enabling a merchant to accept a payment through a service provider without redirecting the customer, according to one embodiment. A user 102 (generally a consumer or consumer user of SP services) may communicate via a mobile or computing device 104 (e.g., a computer, cell phone, computing tablet, smart phone, or other consumer electronic device) with financial service provider (SP) 120 via communication network 106, which may be implemented as a single network or a combination of multiple networks. For example, network 106 may include the Internet as well as phone networks such as Public Switched Telephone Network (PSTN) or one or more intranets, landline networks, wireless networks, or other appropriate types of networks. User 102 may also communicate over communication network 106 using mobile device 104, e.g., a mobile phone of any kind, that can receive messages such as Short Message Service (SMS) messages. Mobile device 104 may include a processor or processor running software that acts as a client 111 for purposes of communication with various servers, such as server 110 or server 122. Mobile device 104 may include a processor or processor running software that acts as a URL shortener 113 and may include other various applications 115 (also referred to as "apps") such as a web browser or image recognition software that can execute on a processor of mobile device 104. Mobile device 104 may also include an imaging device 117 such as a camera or image scanner. Imaging device 117 may be used to scan, photograph, or otherwise capture 119 a graphics image 132 and text information 134 (such as a product or event code) on a display 130 of advertising material such as a poster, magazine ad, or any other type of visual image.

User 102 may also communicate via network 106 with a website 108 that may be, for example, a merchant website that is a seller of retail goods, or a social networking website that facilitates communication of various forms, such as microblogging, between its users or subscribers. Website 108 may operate online and may communicate with user 102, for example, by operating a server 110 (e.g., a computer processor) that presents a website for social networking or selling goods. The server 110 may respond to client devices (e.g., client 111 running on device 104) by communicating over network 106. Website 108 may also maintain a database 114 and provide user accounts for its customers. Database 114 may provide convenience for customers of a merchant website 108 by allowing, for example, users to keep their shipping information on file with the merchant so as not to have to re-enter information with every order, or, for example, the merchant may like to offer promotions for users with an account on merchant website 108. For a social networking website 108, for example, database 114 may provide subscriber or user information, such as profiles and individual web pages.

Website 108 may also communicate (for example, using server 110) with SP 120 through SP server 122 over network 106. For example, website 108 may communicate with SP 120 in the course of various services offered by SP 120 to website 108, such as payment intermediary between customers (e.g., consumer user 102) of website 108 and website 108 itself. For example, a merchant website 108 may use an application programming interface (API) 112 that allows it to run apps and offer sale of goods in which customers are allowed to make payment through SP 120, while consumer user 102 may have an account with SP 120 that allows consumer user 102 to use the SP 120 for making payments to sellers that allow use of authentication, authorization, and payment services 124 (also referred to as financial services 124) of SP 120 as a payment intermediary. In addition or alternatively, a consumer user 102 may have an account with SP 120 for use of URL shortening services 123.

Also as shown in FIG. 1, SP 120 may provide electronic data storage in the form of database 126. Database 126 may be used to keep track of user's accounts 128 with SP 120, whether for URL shortening services 123 or financial services 124, merchant's accounts with SP 120, and transactions between customers, merchants, and stores including payments between the various entities, for example. Database 126 also may be used for operation of URL shortening services 123, for example, by providing updates and lookups to URL information 127 stored in database 126. SP server 122 may execute various application programming interfaces (APIs) that may enable various different types of relationships between SP 120 and the different parties shown in FIG. 1. In addition, SP 120 may provide various APIs 125 to its customers such as website 108 (e.g., API 112) or user 102 that enable those customers to implement embodiments of authentication, authorization, and payment services 124, for example, or URL shortener 113 or URL shortening services 123.

Figure 2A:
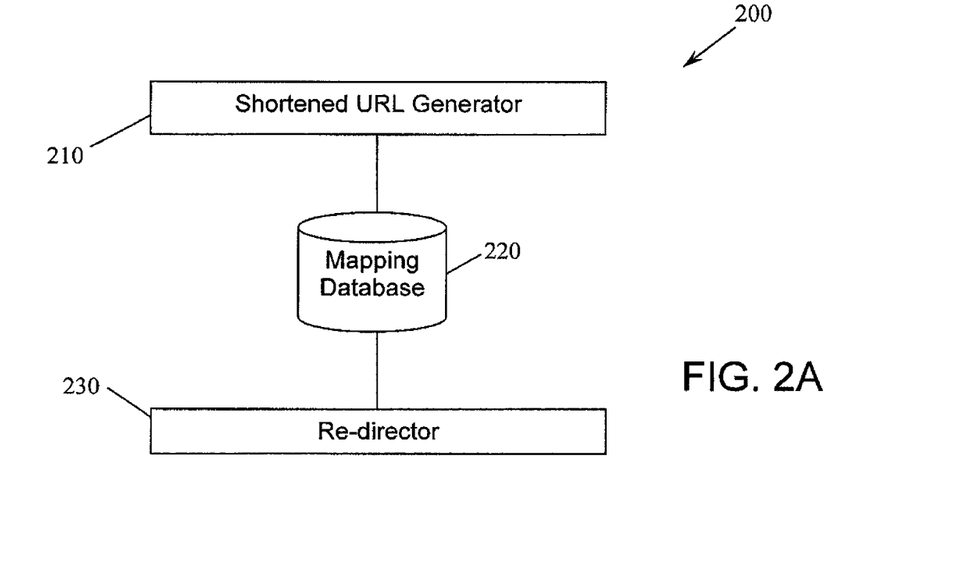
FIGS. 2A and 2B are block diagrams illustrating portions of a URL shortening system in accordance with one or more embodiments.
Figure 2B:
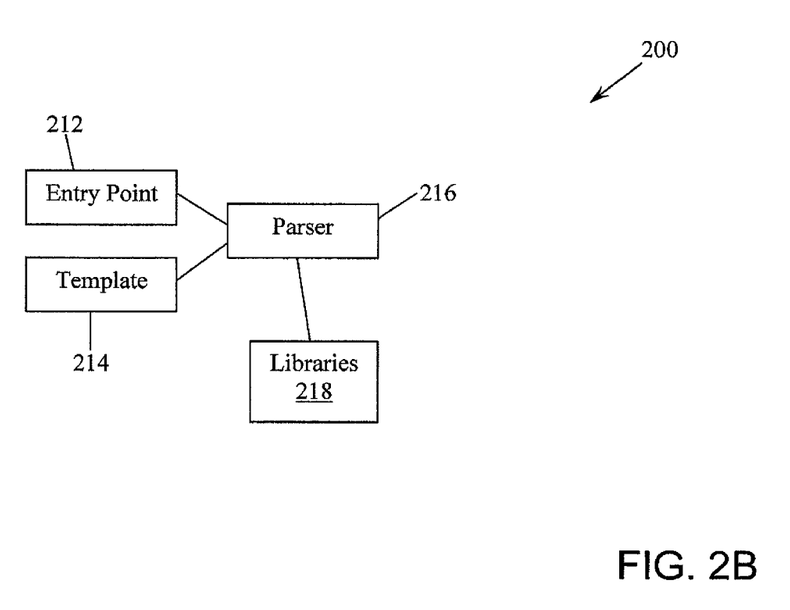

FIGS. 2A and 2B illustrate an example of a system 200 for URL shortening in accordance with one or more embodiments.

Briefly, URL shortener system 200 may operate by defining one or more in a class of special characters to indicate the start of a token (e.g., lexical symbol representing an entity) that represents a URL. In one embodiment, special characters may be taken from an extended character set so that special characters can not be confused with normal text. In another embodiment, a pre-defined graphics image may be recognized as indicating the start of a token. When the client (e.g., Twitter app, Facebook web page, image capture app, or image recognizer app, executing on mobile device 104 running client 111) encounters one of these pre-defined special characters or graphics images (also referred to as an "indicator" or "token indicator"), the client (e.g., URL shortener 113 running on mobile device 104) may create a URL using the token that follows the special character or graphics image encountered.

Referring to FIG. 2A, URL shortener system 200 may include a shortened URL generator 210 for generating shortened URLs from longer URLs, a mapping database 220 for maintaining a correspondence between each longer URL and the shortened URL generated from the longer URL, and a re-director 230 for enabling utilization of the shortened URLs by responding to a request from a client (e.g., a browser or client application) for a shortened URL by redirecting the client to the corresponding longer URL from which the shortened URL was generated. Thus, shortened URL generator 210 may provide, for each new shortened URL that is generated from a longer one, the longer URL and the shortened URL corresponding to the longer URL (e.g., the shortened URL generated from that longer URL) to the mapping database 220. Likewise, re-director 230 may access database 220 to find the longer URL corresponding to a requested shortened URL (e.g., the longer URL from which the requested shorter URL was generated) in responding to each new request to be directed to a shortened URL.

Referring to FIG. 2B, URL shortener system 200 may include an entry point 212 for receiving input (e.g., encountering a special character or graphics image and associated text information) and one or more templates 214 for providing URL link information. URL shortener system 200 also may include a parser 216 for providing syntactic analysis of the received input and providing specific outputs (e.g., shortened URLs or other links, or enabling a process that may then be executed) based, for example, on syntactic analysis of the entry point 112 inputs and an associated template 114. Parser 216, as shown in FIG. 2B, may be in communication with an SP-provided library 218 that may include, for example, various data files, including one or more templates 214, as well as other data and computer readable and executable instructions that may facilitate implementation of URL shortener system 200 (e.g., as URL shortener 113 on mobile device 104). Libraries 218 may, for example, be downloaded from SP 120 to mobile device 104.

URL shortener system 200 may be implemented, for example, as a process executing on a client device—such as mobile device 104—and may, for example, be physically embodied as computer readable and executable instructions stored in a memory of mobile device 104. In one or more embodiments, portions of URL shortener system 200 may be implemented as processes executing on a server device, e.g., SP server 122 or website server 110, that is in communication, for example, over network 106, with mobile device 104.

URL shortener system 200 may encounter or receive input through, or at, entry point 212. Entry point 212 may, for example, be implemented as a process executing on a device and physically embodied in a memory of the device. Entry point 212 may receive input, for example, from user 102, from an app 115 (e.g., a web browser running on mobile device 104), from imaging device 117 (e.g., via image and text recognition software), or from communication via network 106 with, for example, SP 120 or website 108. Entry point 212 may recognize certain indicators—also referred to as identifiers or markers—as the start of a token that represents a URL. "Token" may be used here to mean a group of input symbols that can be recognized (e.g., by parser 216) as a grammatical symbol representing some grammatical entity such as a name, a number, punctuation, or a URL, for example.

Entry point 212 may, as disclosed above, recognize certain specified, or pre-defined, special characters taken from an extended character set. For example, characters such as " ✎ ", " ✉ ", "□", and "♥"—which may be pictographic in nature and may thereby enable a number of novel features in URL shortener system 200—may be recognized as token indicators.

For an example of such novel features, if the indicator character were " ✎ ", and the client were programmed to recognize " ✎ " as a special character that represented a book, which may have an International Standard Book Number (ISBN), the client-side URL shortener system 200 could turn the string " ✎ 1234567890123" into a URL link to a book with ISBN number 1234567890123 on a commerce site such as half.com, bn.com, or amazon.com. For another example, an indicator character such as " ✉ " in conjunction with a number like 12345 could turn into an email address (e.g., mailto: URL) with the help of a server-side lookup that maps the number 12345 into a particular email address.

Also, the use of a visually distinctive character to indicate a reference may allow users to visually recognize the content and destination of short URLs by association with each visually distinctive character. For example, similar to " ✎ " representing a book or other form of writing and " ✉ " representing an email or other form of message or communication in the examples given previously, an "□" could represent links related to weather or a "¤" might be used for making a payment. Such visual recognition of—by a user—and associations made with distinctive graphics or special character symbols may become especially important if the client (e.g., mobile device 104) does not yet support the new, shortened URLs, as the user may still be able to recognize the distinctive symbols as links and could proactively resolve them, using, for example a website where the user may enter the text and be redirected to the proper website or URL.

Entry point 212 also may recognize certain graphics images, e.g., graphics image 132—which may be pre-defined so as to be recognizable by URL shortener system 200—as token indicators. One example of such graphics images is a graphics representation of event tickets along with some corresponding text information, e.g., graphics image 132 and text information 134. Some or all of text information 134 may, for example, serve as a token indicated by graphics image 132, which text information 134 accompanies. The use of graphics images as token indicators in URL shortener system 200, even more so than special characters, also may enable a multiplicity and variety of additional features in URL shortener system 200, examples of which are given above for the case of special characters. Graphics images may further provide a means for advertisers or content providers to display token indicators, for example, in a more attractive, visually appealing, or a more consumer-recognizable form, such as the example given above of graphics image 132 displaying a consumer recognizable image of event tickets.

Pre-defined indicators (both graphics and textual) may be periodically updated, for example, as new graphics images or new identifier characters may be added, or other changes made, to URL shortener system 200. For example, with the recent addition of emoji characters to the Unicode 6.0 character set, the range of possible character symbols that could be used as indicators grows dramatically. For text fonts that support the Unicode 6.0 characters, the emoji range may include characters for a variety of useful symbols including convenience stores, gas stations, restaurants, banks, and other symbols which could be used to differentiate a variety of commerce sites, making them ideally suited for use as token indicators.

URL shortener system 200 also may include one or more templates 214. Templates 214 may be stored as computer readable data, for example, on mobile device 104, in libraries 218 (as noted above), in mapping database 220, on server 110, or server 122. Each template may be associated with one or more token indicators so that, for example, when a particular token indicator is recognized (e.g., a special character or pre-specified graphics image), a corresponding particular template associated with the particular token indicator may be found. A template may be an alphanumeric string, for example, for which one or more optional portions of the string may be chosen according to a strict rule or grammar, having slots or spaces into which parameter values may be "plugged in" or substituted, or other various types of features in any combination. For example, a URL template for use in finding an item at an online auction website might be "http://cgi.ebay.com?itemId=n", where "n" may substituted with the characters following an identifier (e.g., token characters following a token indicator).

URL shortener system 200 may include a parser 216. Parser 216 may, for example, be implemented as a process executing on a device and physically embodied in a memory of the device. For example, parser 216 may be implemented on a mobile device 104, running client 111, as part of a client-side URL shortener 113. Parser 216 may receive inputs (e.g., a token indicator such as a special character or pre-defined graphics image) from entry point 212 as seen in FIG. 2B. Parser 216 may access a template 214, as seen in FIG. 2B. For example, parser 216 may retrieve a template 214 from a library 218, from database 220, or from a memory of a device on which parser 216 is installed. Parser 216 may use the input (e.g., token indicator, graphics, or character) and one or more templates to construct, for example, a URL, a shortened link (e.g., one that could be looked up by a re-director 230 of system 200 or a conventional server-based system), a link for an email address lookup as given in a foregoing example, or other form of useful output or enabled process as illustrated by the foregoing examples.

Figure 3:
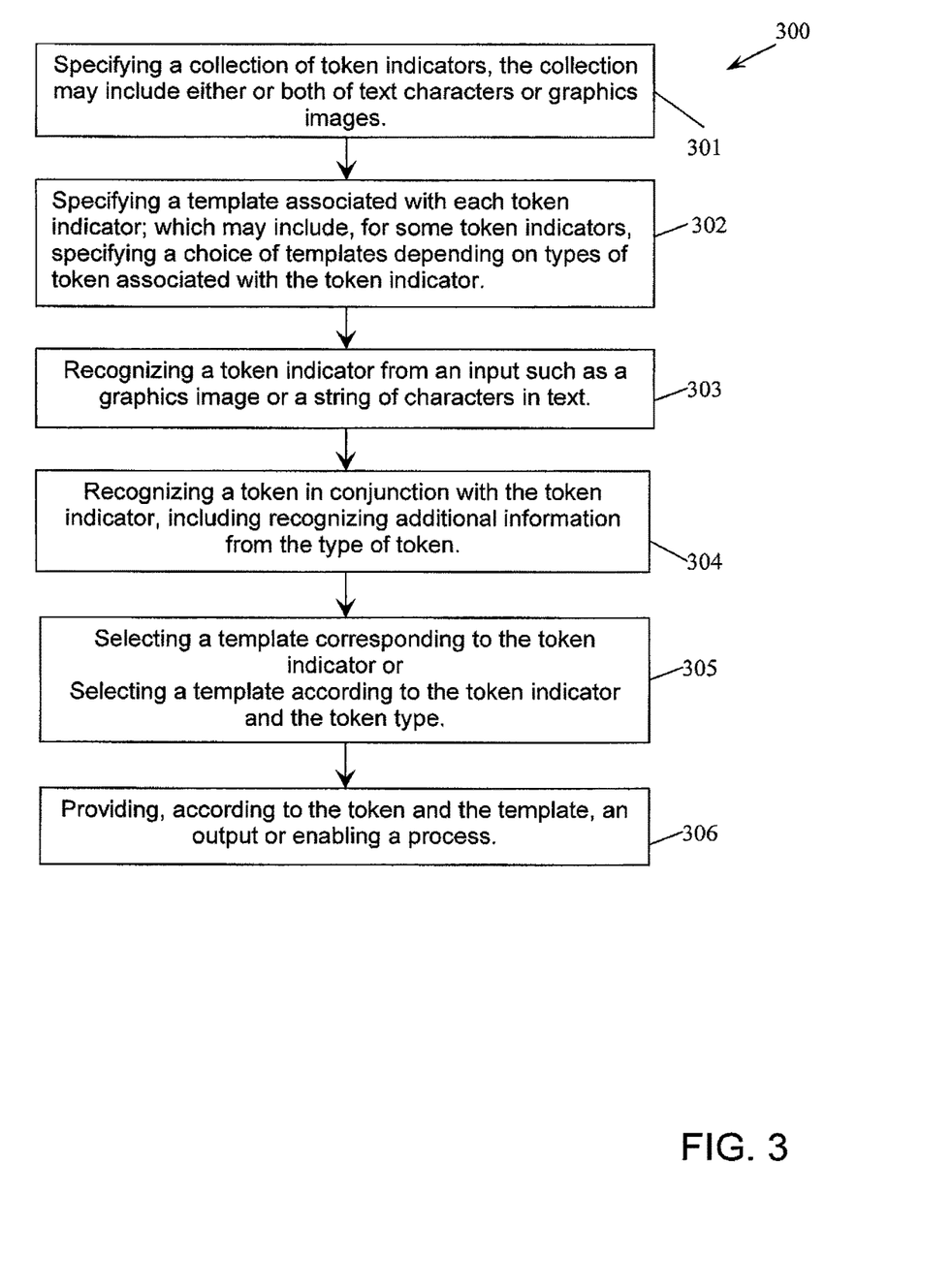
FIG. 3 is a flow chart illustrating a method for URL shortening in accordance with an embodiment.

FIG. 3 illustrates an example of a method 300, in accordance with an embodiment.

At step 301, a collection of token indicators—which may, for example, serve for identifying tokens in lexical analysis and may also be referred to as markers or identifiers—may be defined or specified to indicate the start of a URL token. Step 301 may include, for example, and as described above, one or more of: specifying one or more in a class of special characters, specifying characters that may be recognized as being distinct from normal text, or specifying a graphics image which may be recognizable by an image capture device 117 or image recognition software of mobile device 104. The specification of each token indicator may include an association with a particular functionality of the indicator. For example, "✉" may be associated with an email or other form of text message or communication functionality and "☐" may be associated with links to weather-related sites as illustrated in the foregoing examples.

An association of a single symbol (or graphic) to a particular domain or site—e.g., in the example of the indicator character "📖" recognized as representing a book with the client-side URL shortener system 200 turning the string "📖 1234567890123" into a URL link to a book with ISBN number 1234567890123 on a commerce site such as http://half.com—can be shorter (using the special character to encode the URL's hostname) than the conventional (server-based) URL shortener which typically uses a minimum of 14, and generally closer to 20, characters to encode the URL's hostname. Also, association of a single symbol (or graphic) to a particular domain or other functionality may allow users to recognize the content and destination of short URLs visually, e.g., as described in the foregoing examples concerning books (or other particular commercial items), emails, and weather related sites.

At step 302, method 300 may include specifying a template associated with each pre-defined or pre-specified token indicator resulting from step 301. Specifying a template may include, for some token indicators, specifying a choice of templates depending on the various types of token that may be associated with a particular token indicator. For example, for the special character (token indicator) "✉" representing an email or other form of message or communication, one (e.g., a first) template could be specified so that a number like 12345 could turn into an email address (e.g., mailto: URL) with the help of a server-side lookup that maps the number 12345 into a particular email address, as in the example given above, while another (e.g., a second) template could be specified for the same special character so that a different type of character string like S123 could similarly turn into an SMS phone number with the help of a server-side lookup that maps the string S123 into a particular SMS phone number. Thus, a number—such as 12345—may be defined as being one type of token and a string with an "S" followed by a number—such as S123—may be defined as being another type of token so that each token recognizable by, for example, method 300 or systems 100 or 200, may have a type or a token type associated with the token. Thus, multiple templates may be associated with any token indicator and a template may be associated with a token indicator for each type of token expected to be found in conjunction with the token indicator.

At step 303, method 300 may include recognizing a token indicator from an input such as a graphics image or a string of characters in text. When the client (e.g., URL shortener 113 in communication with a browser or mobile phone app running on mobile device 104, FIG. 1) comes across one of the special characters, for example, the client may be able to recognize a token that follows the special character or graphics image encountered. For example, URL shortener 113 (FIG. 1) may receive or take input from a browser, mobile phone app running on mobile device 104, direct input from a user (e.g., via phone keypad or touchscreen), or graphics image from imaging device 117 when a user, for example, takes a picture or scans a display 130 that may include graphics image 132 with text information 134. The token indicator may be recognized from a string of text or information including the graphics image, for example, by using a parser to scan and analyze the input.

At step 304, method 300 may include recognizing a token in conjunction with the token indicator, including recognizing additional information from the type or token type of the token. In one embodiment, for example, URL shortener 113 may be implemented through the use of a client side parser. The parser may scan the text or graphics to display, searching for an occurrence of the predefined special characters or predefined graphics image. For example, a token may be recognized in conjunction with an indicator character as a character string following the indicator character. A token may also be recognized in conjunction with an indicator character as a character string that occurs in some grammatical construct with the indicator character that is parsable by the parser. With a graphics image, e.g., graphics image 132, a token may be recognizable as part of the graphics image 132, for example, or may be recognized using character recognition for graphics text (e.g., text information 134) accompanying a graphics image, then parsing the recognized characters of text as a token. In addition, the parser may be able to recognize a type for the token by further parsing the token itself and may be able to glean additional information from the token that can be used for providing various specific outputs or enabling specific processes. For example, in one of the foregoing examples, recognizing a token as an ISBN allows method 300 to provide as output a URL link to a book with ISBN number 1234567890123 on a commerce site such as half.com.

At step 305, method 300 may include selecting a template corresponding to the token indicator or selecting a template according to the token indicator and the token type. For the example just presented, the token indicator representing books or writings (e.g., "📖") may be recognized so that the parser may then "know" to further parse the token for its type, allowing the parser to then recognize the token as an ISBN number and provide as output a URL link to a book with ISBN number 1234567890123 on a commerce site such as half.com. Providing such a URL link may be accomplished, for example, by searching a multiplicity of templates corresponding to (e.g., "associated with" or "specified for", in steps 301, 302) the token indicator representing books or writings (e.g., "✍ ") and selecting one of those templates whose associated token type matches that of the type of token (e.g., an ISBN number) recognized in conjunction with the token indicator.

At step 306, method 300 may include providing an output or enabling a process, according to the token and the template. After the client (e.g., mobile device 104) recognizes a token indicator (whether graphic or text character) and parses a token encountered in conjunction with the token indicator, the client may provide an output, for example, by constructing a URL by inserting the characters from the token into a template corresponding to (e.g., specified for or associated with in steps 301 or 302) the token indicator to generate a URL in a computer-readable form.

For example, a client device or app executing method 300, upon finding the string ♥12345, may recognize one of the special identifier characters (e.g., "♥") as a token indicator, then parse the character string (e.g., "12345") following the identifier (token indicator) as a token, and then substitute the token into the template selected (e.g., step 305) for the token indicator. So for a URL template such as "http://cgi.ebay.com?itemId=n", where n is to be substituted with a character string, the character string to be substituted may be the token found in conjunction with the token indicator, in this example "12345", producing the URL "http://cgi.ebay.com?itemId=12345" (e.g. URL in a computer-readable form).

Because the destination (e.g., http://cgi.ebay.com) of the short URL (e.g., "♥12345") may be known to the client (e.g., URL shortener 113 running on mobile device 104) in advance, the client (e.g., mobile device 104) may present a more attractive experience to the user by displaying information from the destination website of the URL generated from the token and the template, for example, by displaying the name of the auction in the case of the eBay site in this example. Also, the destination URL could itself be a server-based shortener, similar to conventional server-based URL shorteners, with the identifier character (token indicator) taking the place of the URL shortener hostname (e.g., "http://is.gd" or "http://bit.ly/") to reduce the length of the conventional URL shortener still further.

In addition, the specification of templates corresponding to special characters or graphics images as token indicators allows method 300 to provide an output (e.g., generate a URL or provide some other function) according to a distinctive visual characteristic of the token indicator. This use of a distinctive character or distinctive graphic to indicate a visually distinctive reference for visual association to a corresponding function may enable a user to recognize the distinctive symbols as URL links, for example, or to recognize the content and destination of short URLs visually by association with each distinctive character.

For example, using foregoing examples for illustration, method 300 may provide as output a URL or some process or action related to a visually distinctive characteristic of one or more symbols or graphic images. To illustrate, consider each of a writing symbol ("✍"), an envelope symbol ("✉ "), and an umbrella symbol ("☐") used in the foregoing examples. One visually distinctive characteristic of the writing symbol may suggest books or other writings, and one output could be the process of finding a book with an ISBN number following the writing symbol and providing a URL link to the book on a preferred website, as in the foregoing examples. A visually distinctive characteristic of the envelope symbol could suggest messages in various formats, and example outputs could be providing an email address or an SMS phone number for text messaging, depending on the token type of the token found in conjunction with the envelope symbol, as in the foregoing examples. A visually distinctive characteristic of the umbrella symbol could suggest things related to weather, and suggest to the user that the client will provide a weather related URL link as output, as in the foregoing examples.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PSTN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system, comprising:
   a non-transitory memory; and
   one or more hardware processors coupled to the non-transitory memory and configured to read instructions from the non-transitory memory to cause the system to perform operations comprising:
   determining an input token corresponding to an identified token marker;
   determining a token marker type associated with the token marker and a token type associated with the input token;
   determining that the token marker type matches a previously stored token marker type and that the token type matches a previously stored token type;
   generating the URL based on a set of rules corresponding to the previously stored token marker type and the previously stored token type; and
   based on the token marker type, the set of rules, and the token type, generating a uniform resource locator (URL), wherein the generating comprises:
   generating a default URL that complies with the set of rules, the default URL including a predefined character string; and
   substituting a portion of the predefined character string with a portion of the input token.

2. The system of claim 1, wherein the input token includes the token marker, and the token marker indicates the beginning of the input token.

3. The system of claim 1, wherein the operations further comprise parsing a string to identify a sequence of one or more symbols, the token marker being identified based on the sequence of one or more symbols.

4. The system of claim 1, wherein the operations further comprise determining a URL hostname corresponding to the token marker type.

5. The system of claim 1, wherein the token marker corresponds to a graphical image or a set of predefined characters.

6. The system of claim 1, wherein the operations further comprise:
   receiving an input shortened URL, the token marker being identified by a character string included in the input shortened URL.

7. The system of claim 5, wherein the set of predefined characters comprise emojis.

8. A method, comprising:
   determining, by a computer comprising one or more hardware processors, an input token corresponding to an identified token marker;
   determining a token marker type associated with the token marker and a token type associated with the input token;
   determining a set of rules corresponding to a previously stored token marker type and a previously stored token type;
   determining the token marker type matches the previously stored token marker type and the token type matches the previously stored token type; and
   based on the token marker type, the set of rules, and the token type, generating a uniform resource locator (URL), wherein the generating comprises:
   generating a default URL that complies with the set of rules, the default URL including a predefined character string; and
   substituting a portion of the predefined character string with a portion of the input token.

9. The method of claim 8, wherein the input token includes the token marker, and the token marker indicates the beginning of the input token.

10. The method of claim 8, further comprising parsing a string to identify a sequence of one or more symbols, the token marker being identified based on the sequence of one or more symbols.

11. The method of claim 8, wherein the determining the input token corresponding to the identified token marker further comprises:

receiving an input string, the token marker being identified based on a sequence of characters included in the input string; and determining the input token based on a second sequence of characters included in the input string.

12. The method of claim 8, further comprising:
determining a URL hostname corresponding to the token marker type.

13. The method of claim 8, wherein the token marker corresponds to a graphical image or a set of predefined characters.

14. The method of claim 13, wherein the set of predefined characters comprise emojis.

15. A non-transitory machine-readable medium having stored thereon machine-readable instructions executable to cause a machine to perform operations comprising:

determining, by a computer comprising one or more hardware processors, an input token corresponding to an identified token marker;

determining a token marker type associated with the token marker and a token type associated with the input token;

determining a set of rules corresponding to a previously stored token marker type and a previously stored token type;

determining the token marker type matches the previously stored token marker type and the token type matches the previously stored token type; and based on the token marker type and the token type, generating a uniform resource locator (URL), wherein the generating comprises:

generating a default URL that complies with the set of rules, the default URL including a predefined character string; and substituting a portion of the predefined character string with a portion of the input token.

16. The non-transitory machine-readable medium of claim 15, wherein the input token includes the token marker, and the token marker indicates the beginning of the input token.

17. The non-transitory machine-readable medium of claim 15, wherein the token marker corresponds to a graphical image or a set of predefined characters.

18. The non-transitory machine-readable medium of claim 17, wherein the set of predefined characters comprise emojis.

19. The non-transitory machine-readable medium of claim 15, wherein the operations further comprise parsing a string to identify a sequence of one or more symbols, the token marker being identified based on the sequence of one or more symbols.

20. The non-transitory machine-readable medium of claim 15, wherein the operations further comprise:

receiving an input shortened URL, the token marker being identified by a character string included in the input shortened URL.

\* \* \* \* \*